(12) United States Patent
Huang et al.

(10) Patent No.: US 12,122,123 B2
(45) Date of Patent: Oct. 22, 2024

(54) COMPOSITE MATERIAL STRUCTURE AND MANUFACTURING METHOD THEREOF

(71) Applicants: Han-Ching Huang, Taipei (TW); Sheng-Hung Lee, Taipei (TW); Jung-Chin Wu, Taipei (TW); Kuo-Nan Ling, Taipei (TW); Chih-Wen Chiang, Taipei (TW); Chien-Chu Chen, Taipei (TW)

(72) Inventors: Han-Ching Huang, Taipei (TW); Sheng-Hung Lee, Taipei (TW); Jung-Chin Wu, Taipei (TW); Kuo-Nan Ling, Taipei (TW); Chih-Wen Chiang, Taipei (TW); Chien-Chu Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 18/322,555

(22) Filed: May 23, 2023

(65) Prior Publication Data

US 2023/0405973 A1 Dec. 21, 2023

Related U.S. Application Data

(60) Provisional application No. 63/352,237, filed on Jun. 15, 2022.

(51) Int. Cl.
*B32B 7/12* (2006.01)
*B32B 15/08* (2006.01)
(Continued)

(52) U.S. Cl.
CPC ............... *B32B 15/14* (2013.01); *B32B 7/12* (2013.01); *B32B 15/08* (2013.01); *B32B 27/08* (2013.01); *B32B 37/1207* (2013.01); *B32B 2250/02* (2013.01); *B32B 2260/021* (2013.01); *B32B 2260/046* (2013.01); *B32B 2305/22* (2013.01);
(Continued)

(58) Field of Classification Search
CPC B32B 7/12; B32B 15/04; B32B 15/14; B32B 15/20
See application file for complete search history.

(56) References Cited

U.S. PATENT DOCUMENTS

2021/0154978 A1* 5/2021 Koori .................. B29C 65/4835

FOREIGN PATENT DOCUMENTS

JP 2012158142 A * 8/2012
TW 201442857 11/2014

OTHER PUBLICATIONS

"Office Action of Taiwan Counterpart Application", issued on Mar. 6, 2024, p. 1-p. 8.

* cited by examiner

*Primary Examiner* — Elizabeth E Mulvaney
(74) *Attorney, Agent, or Firm* — JCIPRNET (57) ABSTRACT

A composite material structure, including an outer layer, an inner layer, and a middle layer, is provided. The outer layer includes a metallic material. The inner layer includes a fiber material and a resin material. The outer layer has a first thickness, the inner layer has a second thickness, and the first thickness is different from the second thickness. The middle layer includes an adhesive material and is disposed between the outer layer and the inner layer. Two opposite surfaces of the middle layer are respectively in direct contact with the outer layer and the inner layer. A manufacturing method of the composite material structure is also provided.

19 Claims, 9 Drawing Sheets

(51) Int. Cl.
 *B32B 15/14* (2006.01)
 *B32B 27/08* (2006.01)
 *B32B 37/12* (2006.01)
(52) U.S. Cl.
 CPC ... *B32B 2307/7376* (2023.05); *B32B 2309/02* (2013.01)

COMPOSITE MATERIAL STRUCTURE AND MANUFACTURING METHOD THEREOF

CROSS-REFERENCE TO RELATED APPLICATION

This application claims the priority benefit of U.S. Provisional Application No. 63/352,237, filed on Jun. 15, 2022. The entirety of the above-mentioned patent application is hereby incorporated by reference herein and made a part of this specification.

BACKGROUND

Technical Field

The disclosure relates to a composite material structure and a manufacturing method thereof.

Description of Related Art

In order to present a metal appearance, the composite material structure is often composed of a metal layer and a resin layer, and the thermal process is often used during the manufacturing process of the composite material structure. As such, the metal layer and the resin layer with a large difference in thermal expansion coefficient may experience warping and deformation due to thermal stress. Furthermore, in order to solve the aforementioned issue, the composite material structure is often manufactured into a symmetrical mirror structure (film layers with the same thickness, density, and/or modulus are manufactured at symmetrical positions). However, the symmetrical mirror structure greatly increases manufacturing cost.

SUMMARY

The disclosure provides a composite material structure and a manufacturing method thereof, which can effectively balance thermal stress while reducing manufacturing cost.

A composite material structure of the disclosure includes an outer layer, an inner layer, and a middle layer. The outer layer includes a metallic material. The inner layer includes a fiber material and a resin material. The outer layer has a first thickness, the inner layer has a second thickness, and the first thickness is different from the second thickness. The middle layer includes an adhesive material and is disposed between the outer layer and the inner layer. Two opposite surfaces of the middle layer are respectively in direct contact with the outer layer and the inner layer.

A manufacturing method of a composite material structure of the disclosure at least includes the following steps. An outer layer including a metallic material is provided. An inner layer including a fiber material and a resin material is provided. The outer layer has a first thickness, the inner layer has a second thickness, and the first thickness is different from the second thickness. A middle layer including an adhesive material is provided. The outer layer and the inner layer are bonded by the middle layer.

Based on the above, in the composite material structure of the disclosure, the use of materials can be effectively reduced and the manufacturing process can be simplified by the design of the asymmetric structure (such as different thicknesses) between the outer layer and the inner layer, and the difference in thermal expansion coefficient between the inner layer and the outer layer can be effectively reduced by the material selection of the inner layer. Therefore, the composite material structure of the disclosure can effectively balance thermal stress while reducing manufacturing cost.

In order for the features and advantages of the disclosure to be more comprehensible, the following specific embodiments are described in detail in conjunction with the drawings.

DETAILED DESCRIPTION OF DISCLOSED EMBODIMENTS

The preferred embodiments of the disclosure will be described in detail below with reference numerals and illustrated with drawings. Wherever possible, the drawings have omitted unnecessary components for clarity of presentation. In addition, element sizes in the drawings are drawn for the convenience of illustration and do not represent the actual scale of the element sizes.

Directional terms (for example, upper, lower, right, left, front, back, top, and bottom) as used herein are used with reference to the drawings only and are not intended to imply absolute orientation.

It should be understood that although terms such as "first", "second", and "third" may be used herein to describe various elements, components, regions, layers, and/or parts, the elements, components, regions, and/or parts should not be limited by the terms. The terms are only used to distinguish one element, component, region, layer, or part from another element, component, region, layer, or part.

Unless otherwise defined, all terms (including technical and scientific terms) used herein have the same meaning as commonly understood by one of ordinary skill in the art to which the disclosure belongs.

Figure 1A:
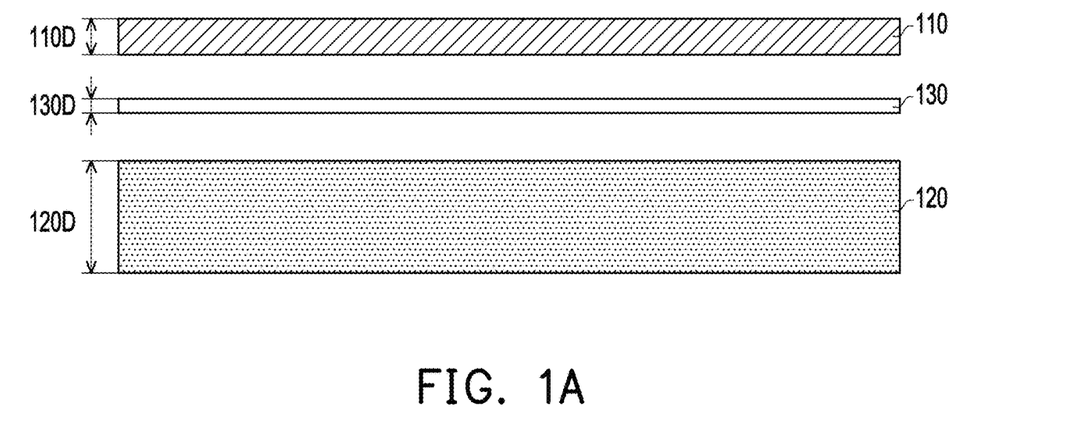
FIG. 1A and FIG. 1B are partially exploded schematic views of a composite material structure according to some embodiments of the disclosure.
Figure 1B:
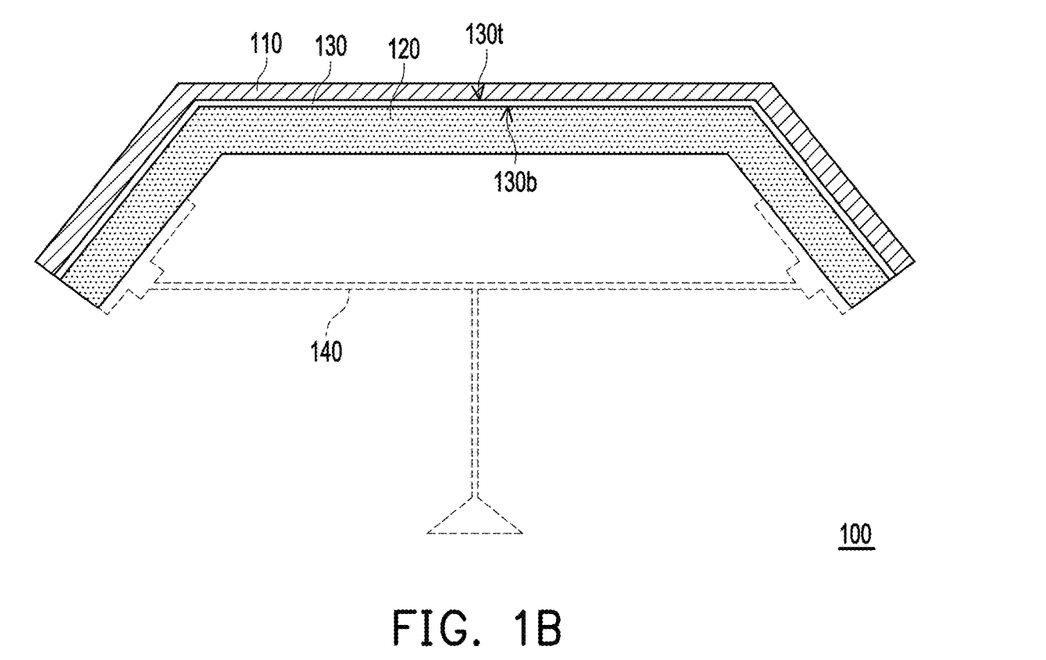
Figure 1C:
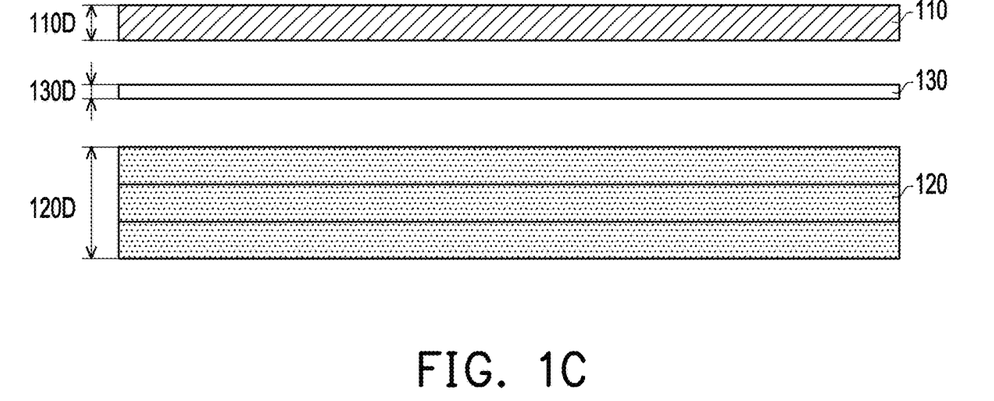
FIG. 1C is a cross-sectional schematic view of a composite material structure according to an embodiment of the disclosure.
Figure 1D:
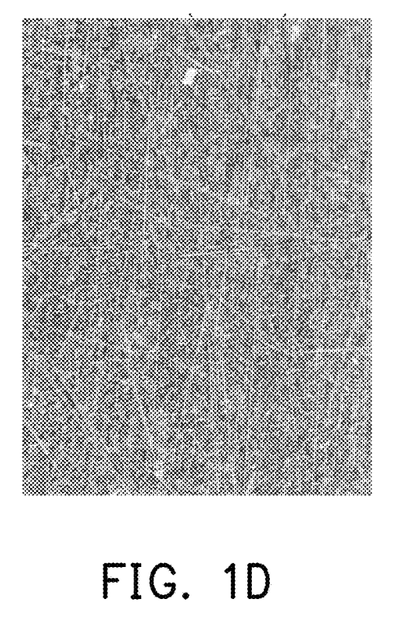
FIG. 1D and FIG. 1E are optical microscope photographs of an inner layer according to some embodiments of the disclosure.
Figure 1E:
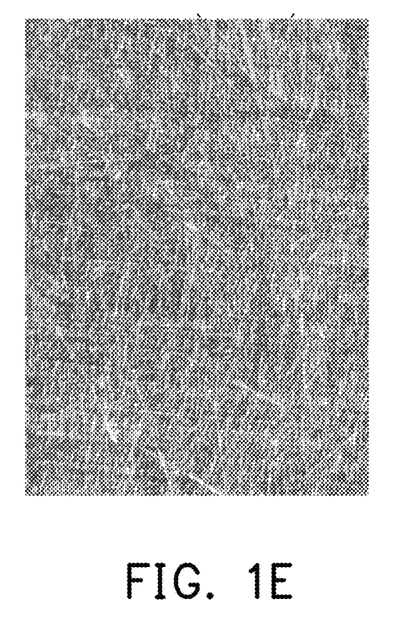

FIG. 1A and FIG. 1B are partially exploded schematic views of a composite material structure according to some embodiments of the disclosure. FIG. 1C is a cross-sectional schematic view of a composite material structure according to an embodiment of the disclosure. FIG. 1D and FIG. 1E are optical microscope photographs of an inner layer according to some embodiments of the disclosure.

Please refer to FIG. 1A to FIG. 1B. In the embodiment, a composite material structure 100 includes an outer layer 110, an inner layer 120, and a middle layer 130, wherein the middle layer 130 is disposed between the outer layer 110 and the inner layer 120, and the two opposite surfaces thereof (for example, an upper surface 130$t$ and a lower surface 130$b$) are respectively in direct contact with the outer layer 110 and the inner layer 120. In addition, the outer layer 110 includes a metallic material, so that the composite material structure 100 may present a metal appearance, the inner layer 120 includes a fiber material and a resin material, and the middle layer 130 includes an adhesive material.

Furthermore, a first thickness 110D of the outer layer 110 is different from a second thickness 120D of the inner layer 120. Accordingly, in the composite material structure 100 of the embodiment, the use of materials can be effectively reduced and the manufacturing process can be simplified by the design of the asymmetric structure between the outer layer 110 and the inner layer 120, and the difference in thermal expansion coefficient between the inner layer 120 and the outer layer 110 can be effectively reduced by the material selection of the inner layer 120. Therefore, the composite material structure of the disclosure can effectively balance thermal stress while reducing manufacturing cost.

Here, the thermal expansion coefficient of the resin material is greater than the thermal expansion coefficient of the metallic material, and the thermal expansion coefficient of the fiber material (for example, a high rigidity material) is between the thermal expansion coefficient of the resin material and the thermal expansion coefficient of the metallic material. Therefore, when the material of the inner layer is a combination of the resin material and the fiber material, the thermal expansion and contraction of the resin material can be suppressed by the fiber material, and the difference in thermal expansion coefficient between the resin material and the metallic material can be reduced, so residual stress can be reduced, and warping and deformation can be effectively reduced. Here, the surface of the inner layer 120 opposite to the outer layer 110 may not have other metallic material film layers.

In some embodiments, the first thickness 110D is less than the second thickness 120D, which can better balance thermal stress. For example, the range of the first thickness 110D may be greater than or equal to 0.1 millimeters (mm) and less than or equal to 1 mm (for example, 0.1 mm, 0.3 mm, 0.5 mm, 0.7 mm, 1 mm, or any value within the range of 0.1 mm to 1 mm), and the range of the second thickness 120D may be greater than 0.1 mm and less than or equal to 5 mm (for example, 2 mm, 3 mm, 4 mm, 5 mm, or any value within the range of greater than 0.1 mm to mm), but the disclosure is not limited thereto.

In some embodiments, the outer layer 110 has a first density and a first modulus, the inner layer 120 has a second density and a second modulus, the first density is different from the second density, and the first modulus is different from the second modulus. For example, the first density is greater than the second density, and the first modulus is greater than the second modulus, but the disclosure is not limited thereto. It should be noted that the density and the modulus are different depending on the selection of the metallic material, the fiber material, and the resin material, that is, the values of the density and the modulus may be inferred based on the selection of the above materials in actual design.

In some embodiments, the metallic material includes aluminum (Al), magnesium (Mg), lithium (Li), titanium (Ti), iron (Fe), or an alloy thereof (for example, magnesium aluminum alloy, magnesium lithium alloy, titanium alloy, or stainless steel (SUS)); the fiber material includes carbon fiber (which may be any suitable carbon fiber), glass fiber, plant fiber, or a combination thereof; and the resin material includes thermoplastic resin and thermosetting resin, wherein the thermoplastic resin includes polycarbonate (PC), polyethylene terephthalate (PET), polymethyl methacrylate (PMMA), polyethylene (PE), propylene-butadiene-styrene resin (ABS), polypropylene (PP), polystyrene (PS), and polyamide (PA), and the thermosetting resin includes epoxy resin and phenolic resin, but the disclosure is not limited thereto.

In some embodiments, the inner layer 120 using only one type of the fiber material is easier to recycle, but the disclosure is not limited thereto.

In some embodiments, the fiber material may be discontinuous fibers formed by cutting long fibers into multiple segments of short fibers (the length of the fiber material is, for example, between 5 mm and 25 mm), but the disclosure is not limited thereto.

In some embodiments, the weight ratio of the fiber material to the inner layer 120 is between 10 wt % and 60 wt % (for example, 10 wt %, 20 wt %, 40 wt %, 60 wt %, or any value within the range of 10 wt % to 60 wt %). For example, the inner layer 120 may be composed of only the fiber material and the resin material, so when the weight ratio of the fiber material used is 10 wt %, the weight ratio of the resin material used is 90 wt %, when the weight ratio of the fiber material used is 40 wt %, the weight ratio of the resin material used is 60 wt %, and when the weight ratio of the fiber material used is 60 wt %, the weight ratio of the resin material used is 40 wt %. With the combination of the fiber material and the resin material in the above ratios, the ratio of the X-axis flexural modulus to the Y-axis flexural modulus of the inner layer 120 (X-axis flexural modulus/Y-axis flexural modulus) can be effectively controlled to be less than 200% (measured according to ASTM D790) while reducing the probability of poor impregnation and bonding (there are good impregnation in both cases where the addition amount of the resin material (PC) is 72 wt % and the addition amount of carbon fiber is 28 wt % in a wet carbon fiber mat (fiber area weight (FAW): 68 g/m$^2$) as shown in FIG. 1D and where the addition amount of the resin material is 69 wt % and the addition amount of carbon fiber is 31 wt % in a dry carbon fiber mat (FAW: 159 g/m$^2$) as shown in FIG. 1E), but the disclosure is not limited thereto. Here, during the manufacturing process of the fiber material, there may be different moduli in the machine direction (MD) and the transverse direction (TD) through controlling the directional degree of fibers (corresponding to the water flow direction in the reforming process), wherein the machine direction may be the X axis, and the transverse direction may be the Y axis.

Further, the Y axis (weak axis) may easily break when the fiber materials are in the same direction (for example, all arranged in the X-axis (strong axis) direction). However, in the embodiment, the weight ratio of the fiber material is controlled to be between 10 wt % and 60 wt %, even in the case where the difference in arrangement ratio is maximized, if the fiber materials are all arranged in the X-axis (strong axis) direction, the ratio of the X-axis flexural modulus to the Y-axis flexural modulus may still be controlled to be less than 200%, that is, the Y axis is less likely to break under the ratio, but the disclosure is not limited thereto. In other embodiments, the fiber materials may also use anisotropic fiber arrangement. For example, a part of the fiber materials is arranged in the X-axis direction, and a part of the fiber materials is arranged in the Y-axis direction. In this way, the probability of the Y axis breaking can be further reduced.

In some embodiments, the weight ratio of the fiber material to the inner layer 120 is between 20 wt % and 40 wt %, and the weight of the inner layer 120 is equal to the total weight of the fiber material and the resin material, which can have better control, but the disclosure is not limited thereto.

In some embodiments, the addition amount of the fiber material and the thermal expansion coefficient of the inner layer 120 show a non-linear inverse relationship, but the disclosure is not limited thereto.

In the embodiment of FIG. 1A, the inner layer 120 is only a one-layer structure, but the disclosure is not limited thereto. In other embodiments, as shown in FIG. 1C, the inner layer 120 may be composed of multiple sub-layers (schematically shown as three layers in FIG. 1C, but may also be two layers, four layers, or more), wherein the composition and the thickness of each sub-layer may be the same to further improve the thermal stability of the composite material structure, but the disclosure is not limited thereto.

In some embodiments, the middle layer 130 includes a film selected from epoxy resin, polyether polyol, polyurethane (PU), or a combination thereof, but the disclosure is not limited thereto. The middle layer 130 may be any suitable adhesive material.

In some embodiments, a third thickness 130D of the middle layer 130 is between 0.01 mm and 0.3 mm (for example, 0.01 mm, 0.05 mm, 0.1 mm, 0.3 mm, or any value within the range of 0.01 mm to 0.3 mm), but the disclosure is not limited thereto.

In some embodiments, the glass softening temperature of the middle layer 130 is between and 180° C. (for example, 65° C., 80° C., 140° C., 180° C., or any value within the range of 65° C. to 180° C.). Therefore, when a low-temperature hot pressing process is to be used subsequently, the middle layer 130 can be effectively softened, but the disclosure is not limited thereto.

In some embodiments, the glass softening temperature of the middle layer 130 is between and 90° C., which can be closer to a low-temperature process, but the disclosure is not limited thereto.

In some embodiments, as shown by the dotted line part of FIG. 1B, a structural member 140 may be optionally formed on the inner layer 120, wherein the material of the structural member 140 may be the same type of fiber and resin as the inner layer 120 to facilitate subsequent recycling. For example, if the inner layer 120 is a carbon fiber mat impregnated with PC resin, the injection molded structural member 140 is preferably made of an injection material of PC and carbon fiber, but the disclosure is not limited thereto. Here, the structural member 140 may have different shapes and configurations depending on actual product requirements, such as the configuration of an electronic casing shown in FIG. 1B, but the disclosure is not limited thereto.

The specific implementation configuration of the composite material structure of the disclosure will be described in more detail below. However, it should be noted that although the following embodiments have been described, without exceeding the scope of the disclosure, the details of the materials used, the process, etc. may be appropriately changed, and the disclosure should not be limited by the embodiments described below.

As shown in Table 1, when the PC resin material and the carbon fiber material are used as the inner layer 120, even under different thicknesses, the thermal expansion coefficient thereof can be effectively drawn closer to the thermal expansion coefficient of the outer layer 110 using aluminum alloy, so there is no need to form an additional matching metal layer on the other surface of the inner layer 120 opposite to the outer layer 110. In this way, the use of materials can be effectively reduced and the manufacturing process can be simplified. In addition, in Table 1, the weight concentration of carbon fiber added is 30 wt % (all arranged in the X-axis direction), the weight concentration of PC resin added is 70 wt %, and the X-axis flexural modulus is 19.5 GPa and the Y-axis flexural modulus is 9.93 GPa as measured according to ASTM D790, so the ratio of the X-axis flexural modulus to the Y-axis flexural modulus (X-axis flexural modulus/Y-axis flexural modulus) is about 196%, which can be effectively controlled under 200%.

Here, Table 1 presents the thermal expansion coefficient of the Y axis, and the thermal expansion coefficient is measured using the model TA Q400-EM thermomechanical analyzer (TMA). In addition, other relevant values are omitted to clearly illustrate the disclosure, wherein the values should be obtainable by persons with ordinary knowledge in the art of the disclosure by inferring from the currently disclosed content of the disclosure.

TABLE 1

| Material | Condition | Thermal expansion coefficient (μm/m · ° C.) | Thickness (mm) |
| --- | --- | --- | --- |
| Aluminum alloy | 25° C.~160° C. | 25.55 | 0.3 |
| Carbon fiber and PC resin | 25° C.~160° C. | 24.86 | 0.7 |
| PC resin | 25° C.~160° C. | 70.2 | 0.04 |

It should be noted that the first thickness 110D, the second thickness 120D, and the third thickness 130D may be of uniform thicknesses, that is, the distances between the vertical connecting lines of two ends at each position of the outer layer 110, the inner layer 120, and the middle layer 130 are the same, but the disclosure is not limited thereto. In an unillustrated embodiment, the first thickness, the second thickness, and the third thickness may also be the maximum thicknesses in the outer layer, the inner layer, and the middle layer.

A main manufacturing process of the composite material structure according to some embodiments of the disclosure is illustrated below with the drawings. It must be noted here that the following continues to use the reference numerals and some content of the above embodiments, wherein the same or similar reference numerals are adopted to denote the same or similar elements, and the description of the same technical content is omitted. Reference may be made to the above embodiments for the description of the omitted part, which will not be repeated here.

FIG. 2A to FIG. 2D are schematic views of a manufacturing method of a composite material structure according to some embodiments of the disclosure.

Figure 2A:
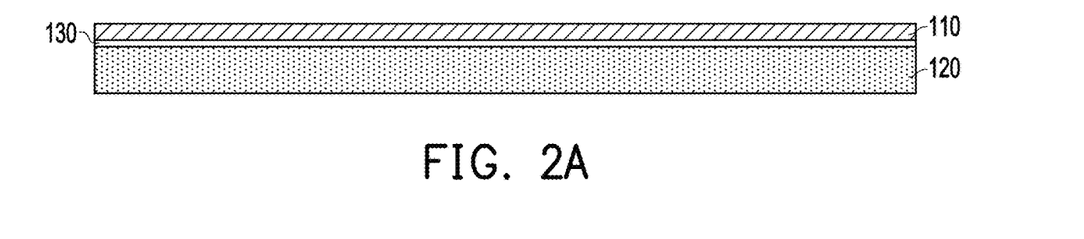
FIG. 2A to FIG. 2D are schematic views of a manufacturing method of a composite material structure according to some embodiments of the disclosure.

Please refer to FIG. 2A. In an embodiment, firstly, the outer layer 110 including the metallic material is provided. The inner layer 120 including the fiber material and the resin material is provided. The middle layer 130 including the adhesive material is provided. Then, the outer layer 110 and the inner layer 120 are bonded (for example, by a low-temperature hot pressing and bonding process, wherein the temperature is, for example, lower than 100° C.) by the middle layer 130. Here, the outer layer 110, the middle layer 130, and the inner layer 120 may have the same width, and the outer layer 110 may completely cover the surfaces of the middle layer 130 and the inner layer 120, but the disclosure is not limited thereto. In another embodiment, the middle layer 130 and the inner layer 120 have the same width, and the width of the inner layer 120 is less than the width of the outer layer 110.

Figure 2B:
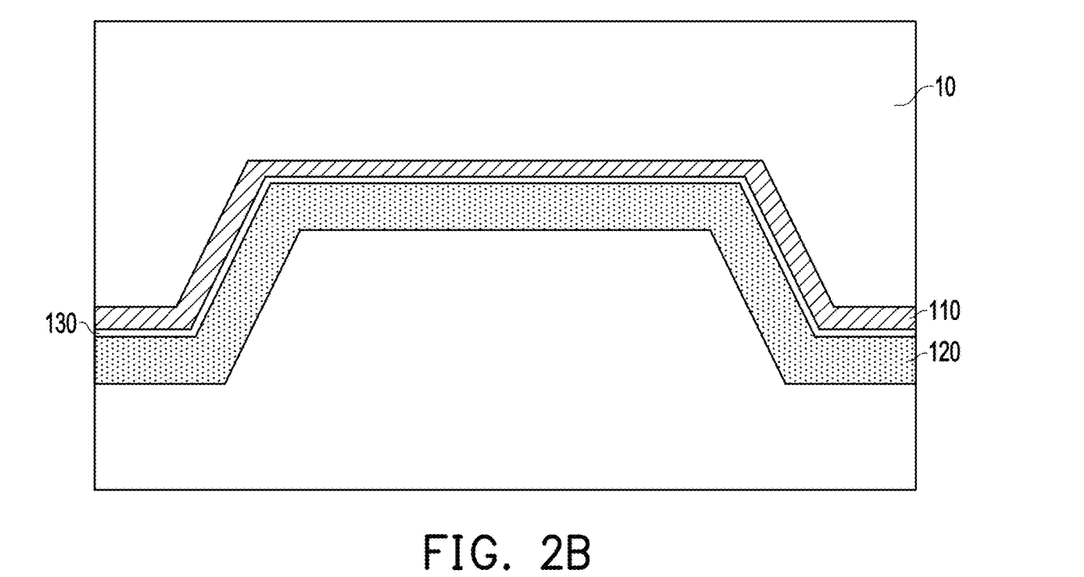

Please refer to FIG. 2B. A mold 10 is used to further perform a hot pressing and forming process on the bonded structure, wherein the hot pressing temperature is, for example, greater than the glass transition temperature (Tg) of the resin material in the inner layer 120, such as greater than 100° C.

Figure 2C:
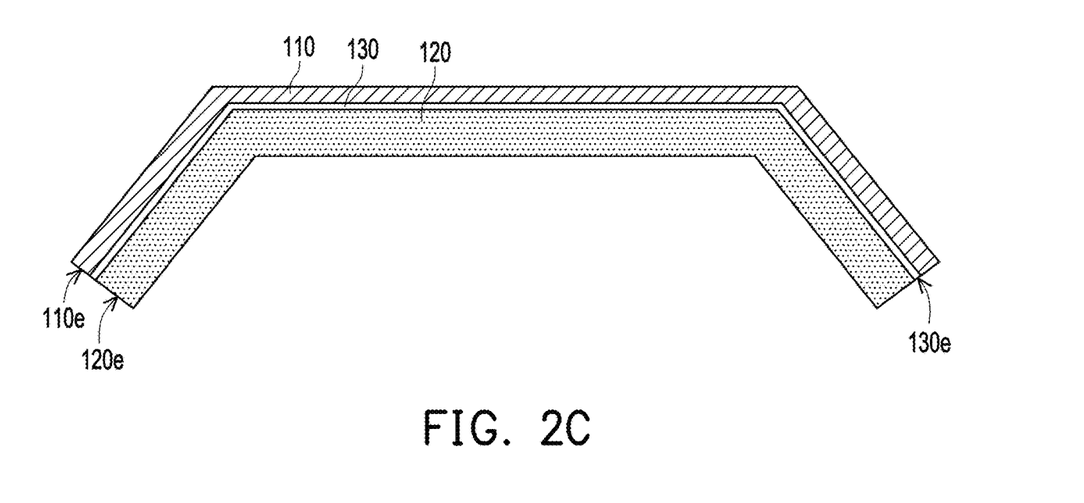

Please refer to FIG. 2C. The mold 10 is removed and a trimming process is performed, so an edge 110e of the outer layer 110, an edge 130e of the middle layer 130, and an edge 120e of the inner layer 120 may be aligned, but the disclosure is not limited thereto, wherein this step may be performed optionally.

Figure 2D:
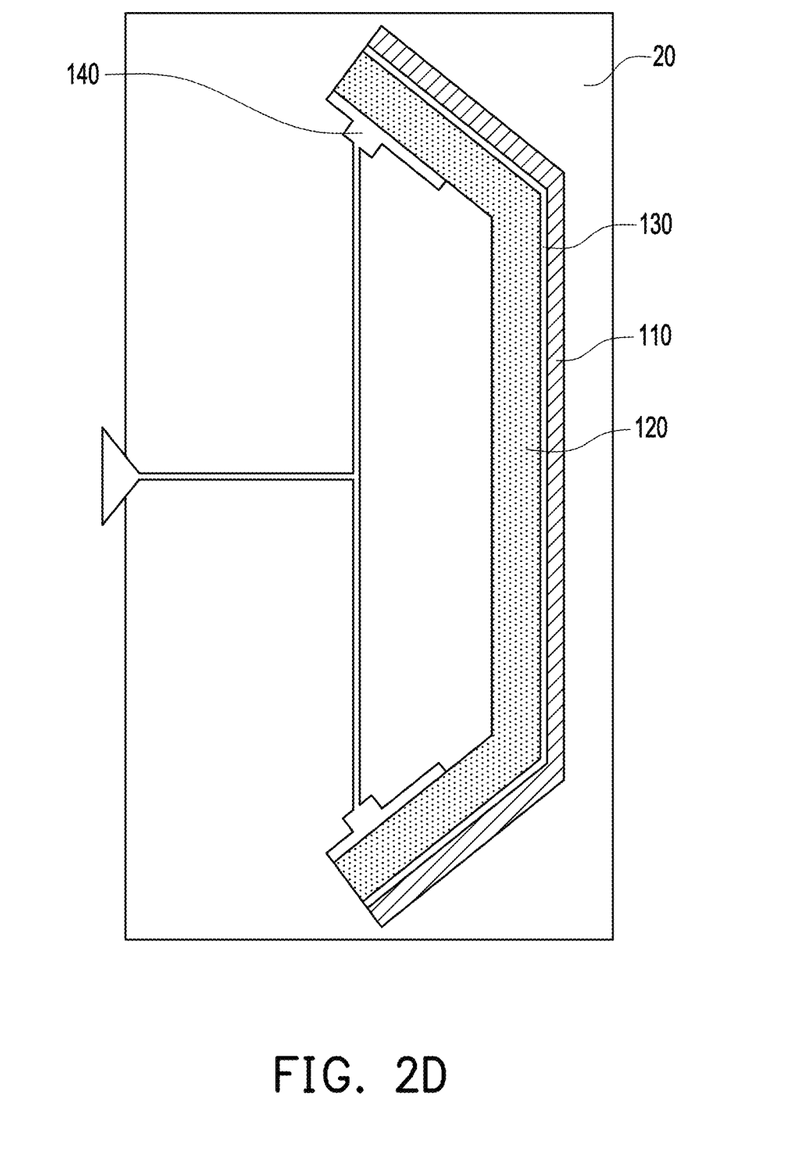

Please refer to FIG. 2D and FIG. 1B. A mold 20 is used to perform an injection molding process to form the structural member 140. Then, the mold 20 is removed to form the composite material structure 100 as shown in FIG. 1B.

FIG. 3A to FIG. 3D are schematic views of a manufacturing method of a composite material structure according to some embodiments of the disclosure.

Figure 3A:
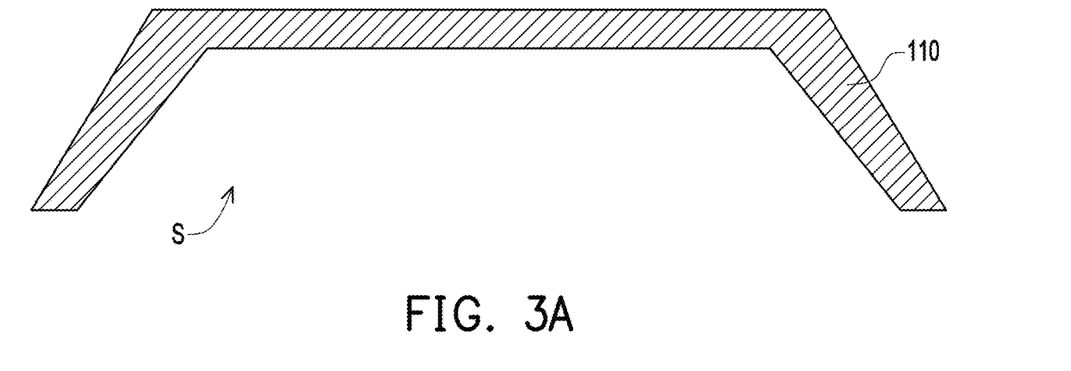
FIG. 3A to FIG. 3D are schematic views of a manufacturing method of a composite material structure according to some embodiments of the disclosure.
Figure 3B:
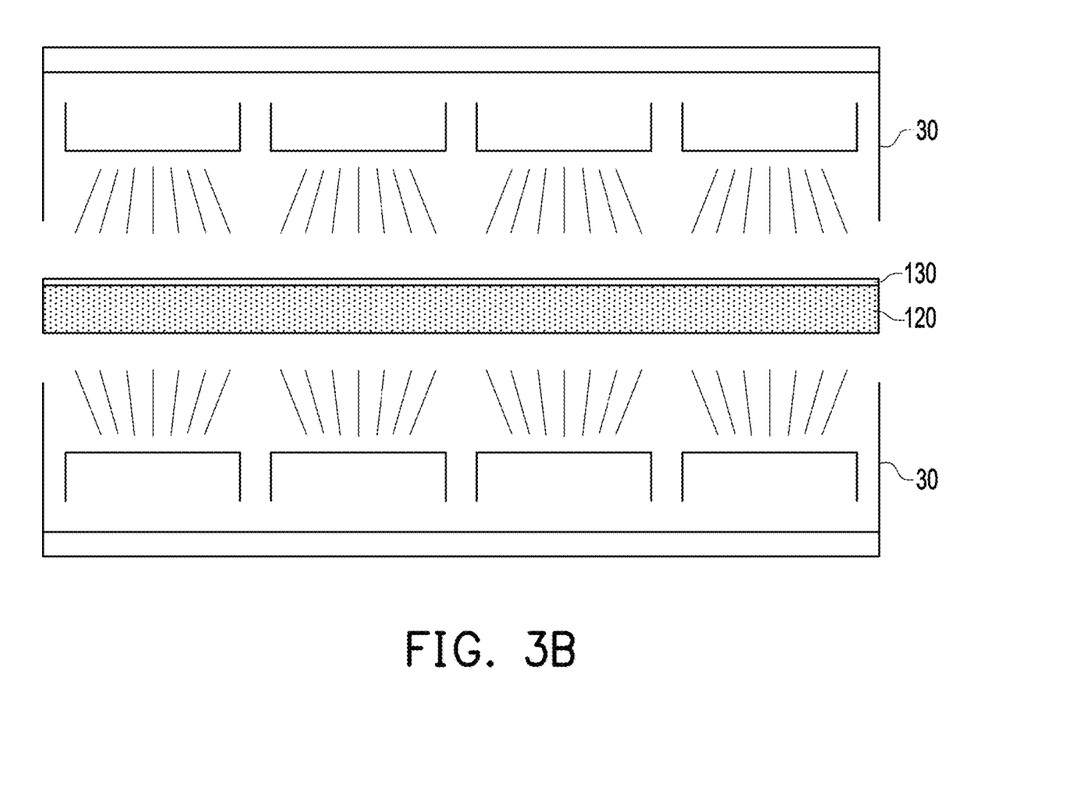

Please refer to FIG. 3A and FIG. 3B. In an embodiment, firstly, the outer layer 110 including the metallic material is provided. The inner layer 120 including the fiber material and the resin material and the middle layer 130 including the adhesive material are provided, wherein before bonding the outer layer 110 and the inner layer 120, a stamping process is performed on the outer layer 110 to form the required shape and a space S (as shown in FIG. 3A) that may subsequently cover the inner layer 120 on the one hand, and to bond the inner layer 120 and the middle layer 130 and use a suitable heating device 30 to perform a preheating process (as shown in FIG. 3B) on the other hand, wherein the inner layer 120 may be thermoplastic resin. Furthermore, the preheating temperature is, for example, greater than the glass transition temperature of the resin material in the inner layer 120, such as greater than 100° C.

Figure 3C:
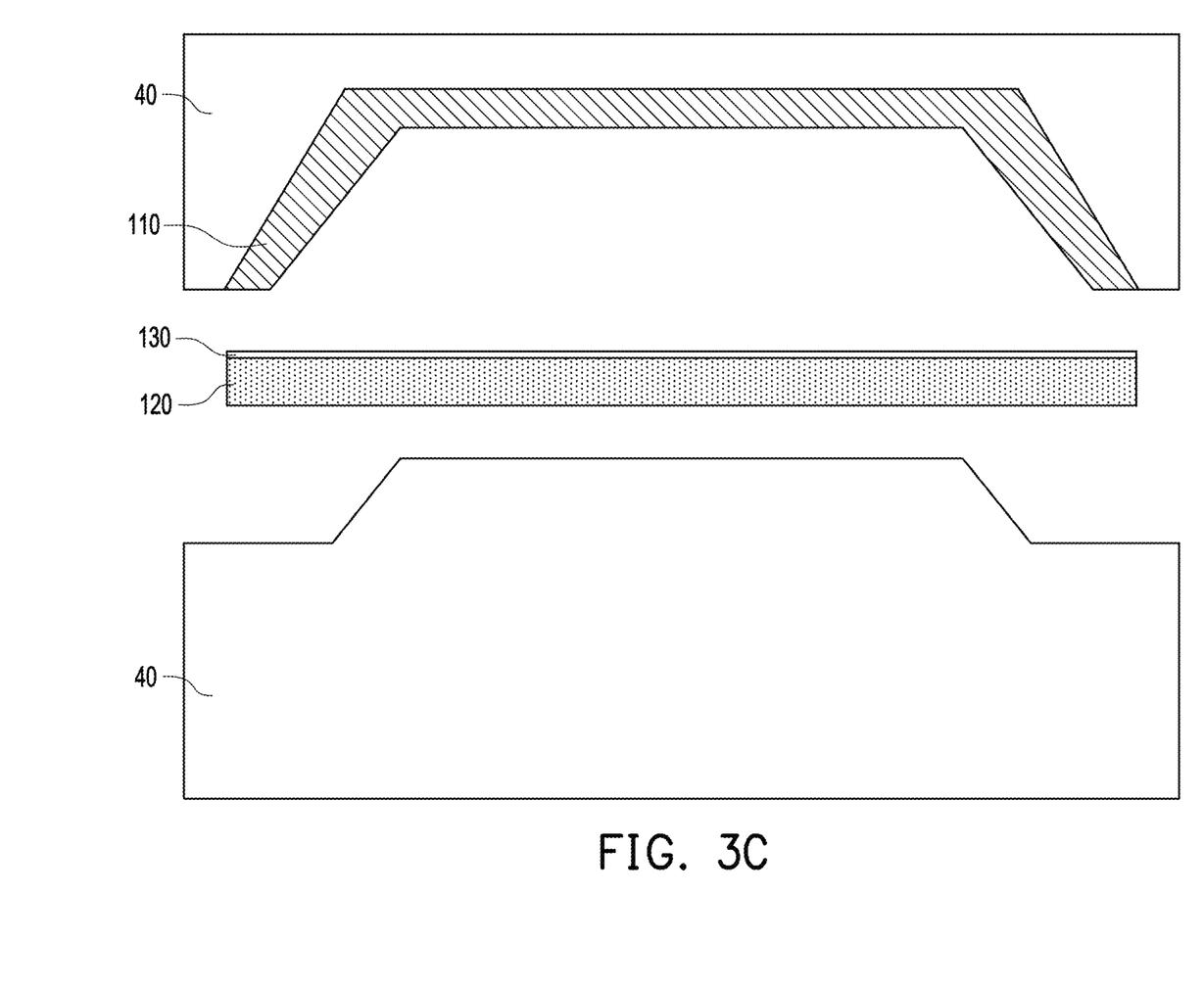

Please refer to FIG. 3C. The stamped outer layer 110 is placed in a mold 40 for positioning, and the preheated inner layer 120 and middle layer 130 are placed between an upper half and a lower half of the mold 40. Next, the inner layer 120 and the middle layer 130 are pressed into the mold 40 for a hot pressing and forming process, and the mold 40 is then removed.

Figure 3D:
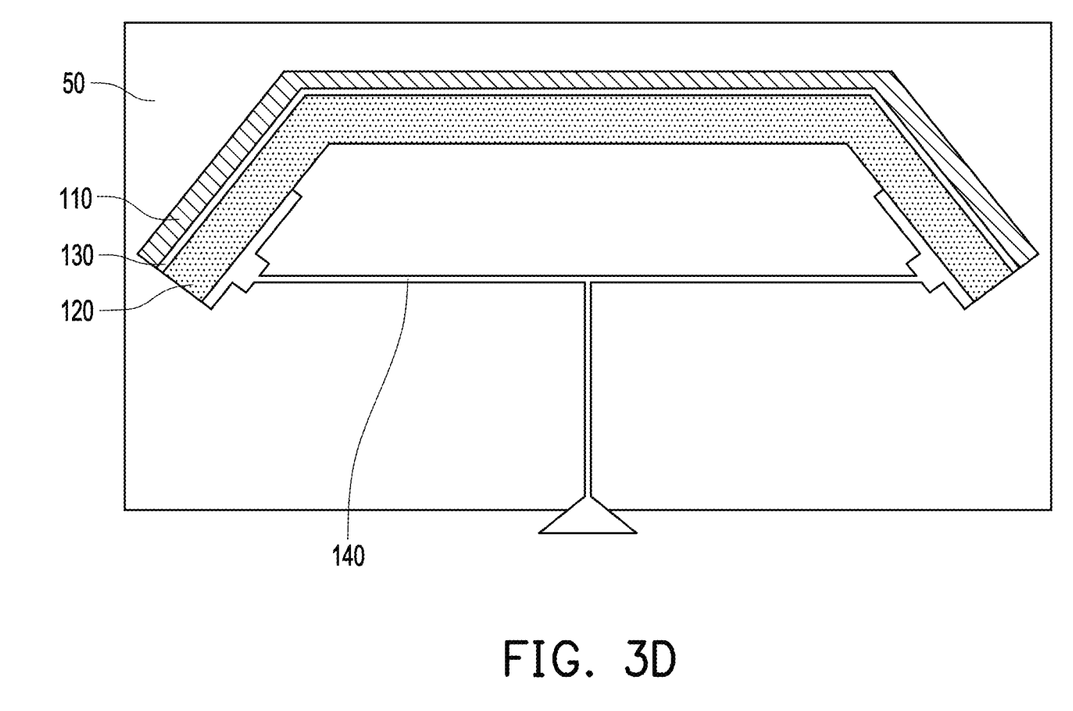

Please refer to FIG. 3D and FIG. 1B. After removing the mold 40, an injection molding process is performed using a mold 50 (similar to the mold 20) to form the structural member 140. Then, the mold 50 is removed to form the composite material structure 100 as shown in FIG. 1B.

FIG. 4A to FIG. 4D are schematic views of a manufacturing method of a composite material structure according to some embodiments of the disclosure.

Figure 4A:
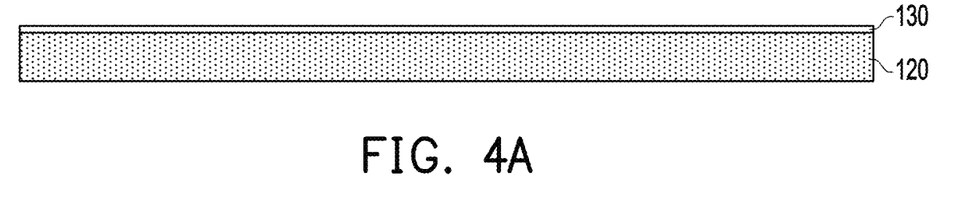
FIG. 4A to FIG. 4D are schematic views of a manufacturing method of a composite material structure according to some embodiments of the disclosure.
Figure 4B:
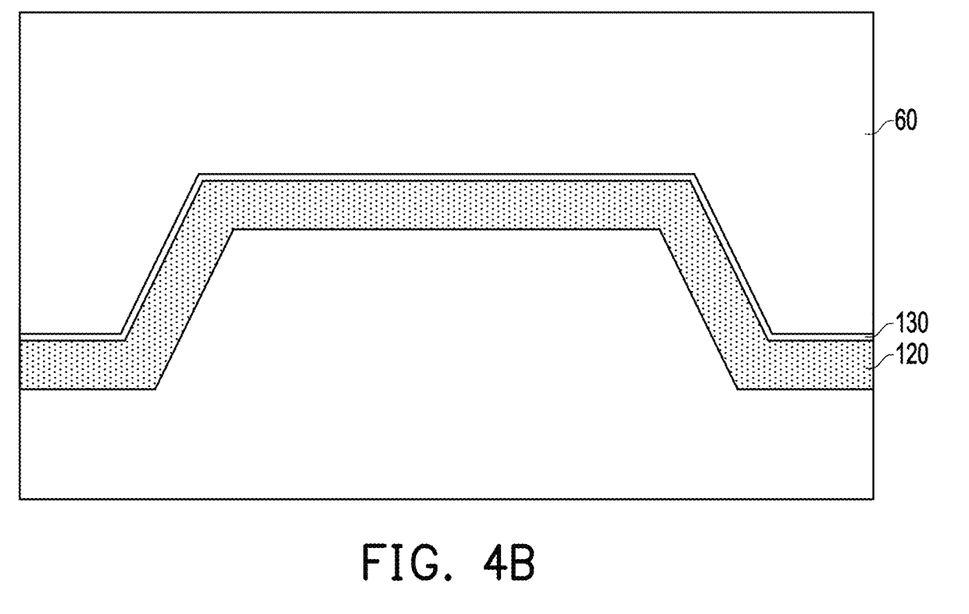
Figure 4C:
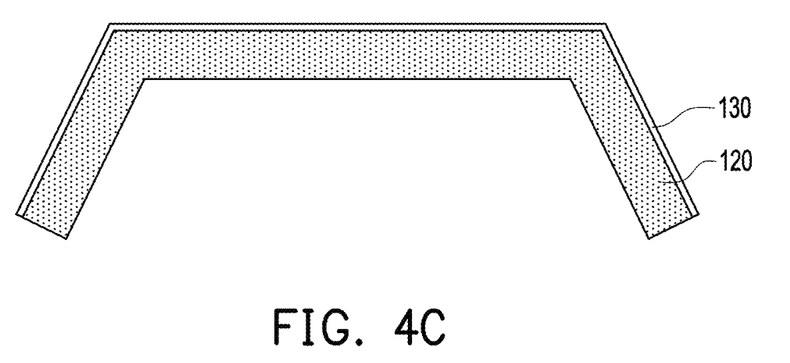
Figure 4D:
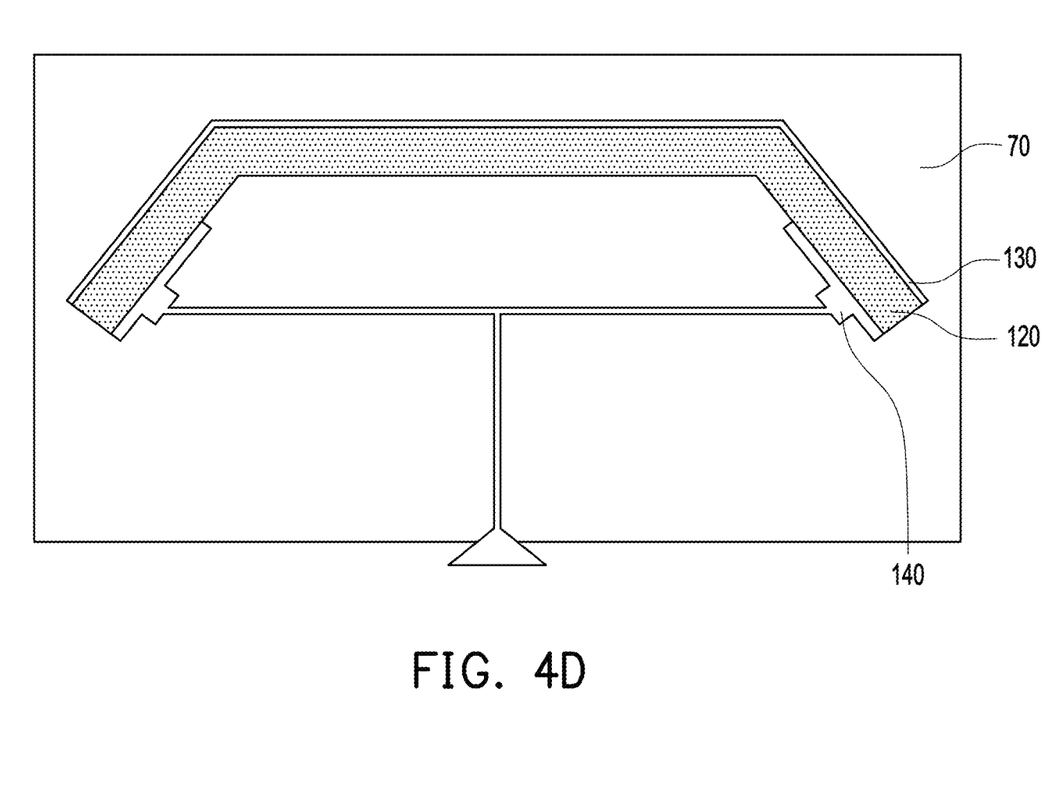

In an embodiment, please refer to FIG. 4A to FIG. 4D and FIG. 1B. The inner layer 120 including the fiber material and the resin material and the middle layer 130 (as shown in FIG. 4A) are provided, wherein before bonding the outer layer 110 and the inner layer 120, a hot pressing and forming process is performed on the inner layer 120 and the middle layer 130 by a mold 60 (as shown in FIG. 4B). Then, the mold 60 is removed and a trimming process (as shown in FIG. 4C) is performed, so the edges of the outer layer 110 and the middle layer 130 may be aligned, but the disclosure is not limited thereto, wherein this step may be performed optionally. Then, an injection molding process is performed using a mold 70 (similar to the molds 20 and 50) to form the structural member 140. Next, the mold 70 is removed.

In another aspect, the outer layer 110 including the metallic material is provided. Before bonding the outer layer 110 and the inner layer 120, a stamping process is performed on the outer layer 110 to form the required shape and the space S that may subsequently cover the inner layer 120, as shown in FIG. 3A. Then, after removing the mold 70, the formed inner layer 120 and middle layer 130 are hot pressed and bonded to the formed outer layer 110 as shown in FIG. 3A to form the composite material structure 100 as shown in FIG. 1B.

It should be noted that the disclosure of the molds 10, 20, 40, 50, 60, and 70 may be designed and selected by persons with ordinary knowledge in the art according to the actual manufacturing process and the required product under the spirit of the disclosure, and is not limited by the disclosure and will not be repeated here.

In summary, in the composite material structure of the disclosure, the use of materials can be effectively reduced and the manufacturing process can be simplified by the design of the asymmetric structure (such as different thicknesses) between the outer layer and the inner layer, and the difference in thermal expansion coefficient between the inner layer and the outer layer can be effectively reduced by the material selection of the inner layer. Therefore, the composite material structure of the disclosure can effectively balance thermal stress while reducing manufacturing cost.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A composite material structure, comprising:
    an outer layer, comprising a metallic material;
    an inner layer, comprising a fiber material and a resin material, wherein the outer layer has a first thickness, the inner layer has a second thickness, the first thickness is different from the second thickness, and a ratio of an X-axis flexural modulus to a Y-axis flexural modulus of the inner layer is less than 200%; and
    a middle layer, comprising an adhesive material and disposed between the outer layer and the inner layer, wherein two opposite surfaces of the middle layer are respectively in direct contact with the outer layer and the inner layer.

2. The composite material structure according to claim 1, wherein the first thickness is less than the second thickness.

3. The composite material structure according to claim 1, wherein a range of the first thickness is greater than or equal to 0.1 mm and less than or equal to 1 mm, and a range of the second thickness is greater than 0.1 mm and less than or equal to 5 mm.

4. The composite material structure according to claim 1, wherein the outer layer has a first density and a first modulus, the inner layer has a second density and a second modulus, the first density is different from the second density, and the first modulus is different from the second modulus.

5. The composite material structure according to claim 1, wherein an edge of the outer layer, an edge of the middle layer, and an edge of the inner layer are aligned.

6. The composite material structure according to claim 1, wherein:
    the outer layer, the middle layer, and the inner layer have a same width; or the middle layer and the inner layer have a same width, and a width of the inner layer is less than a width of the outer layer.

7. The composite material structure according to claim 1, wherein a length of the fiber material is between 5 mm and 25 mm.

8. The composite material structure according to claim 1, wherein a weight ratio of the fiber material to the inner layer is between 10 wt % and 60 wt %.

9. The composite material structure according to claim 1, wherein the metallic material comprises aluminum, magnesium, lithium, titanium, iron, or an alloy thereof.

10. The composite material structure according to claim 1, wherein the fiber material comprises carbon fiber, glass fiber, plant fiber, or a combination thereof.

11. The composite material structure according to claim 1, wherein the resin material comprises polycarbonate, polyethylene terephthalate, polymethyl methacrylate, polyethylene, propylene-butadiene-styrene resin, polypropylene, polystyrene, polyamide, epoxy resin, or phenolic resin.

12. The composite material structure according to claim 1, wherein the inner layer is composed of one or more sub-layers.

13. The composite material structure according to claim 1, wherein the middle layer comprises a film selected from epoxy resin, polyether polyol, polyurethane, or a combination thereof.

14. The composite material structure according to claim 1, wherein the middle layer has a third thickness, and the third thickness is between 0.01 mm and 0.3 mm.

15. The composite material structure according to claim 1, wherein a glass softening temperature of the middle layer is between 65° C. and 180° C.

16. A manufacturing method of a composite material structure, comprising:
providing an outer layer comprising a metallic material;
providing an inner layer comprising a fiber material and a resin material, wherein the outer layer has a first thickness, the inner layer has a second thickness, the first thickness is different from the second thickness, and a ratio of an X-axis flexural modulus to a Y-axis flexural modulus of the inner layer is less than 200%;
providing a middle layer comprising an adhesive material; and
bonding the outer layer and the inner layer by the middle layer.

17. The manufacturing method according to claim 16, wherein a hot pressing and forming process is further performed on a bonded structure.

18. The manufacturing method according to claim 16, wherein before bonding the outer layer and the inner layer, a stamping process is performed on the outer layer, and the inner layer and the middle layer are bonded and a preheating process is performed.

19. The manufacturing method according to claim 16, wherein before bonding the outer layer and the inner layer, a stamping process is performed on the outer layer, and a hot pressing and forming process is performed on the inner layer and the middle layer.

* * * * *